United States Patent
Engle et al.

(10) Patent No.: US 7,252,385 B2
(45) Date of Patent: Aug. 7, 2007

(54) PROJECTION LED COOLING

(75) Inventors: T. Scott Engle, Tualatin, OR (US); David E. Slobodin, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/843,829

(22) Filed: May 11, 2004

(65) Prior Publication Data

US 2005/0254013 A1  Nov. 17, 2005

(51) Int. Cl.
G03B 21/16 (2006.01)
G03B 21/18 (2006.01)
G03B 21/20 (2006.01)

(52) U.S. Cl. ............................. 353/52; 353/54; 353/57; 353/85

(58) Field of Classification Search ................. 353/52, 353/54, 57, 60, 85; 349/161
See application file for complete search history.

(56) References Cited

U.S. PATENT DOCUMENTS

| | | | | |
|---|---|---|---|---|
| 3,761,197 A | * | 9/1973 | Kelly | ........................ 415/159 |
| 3,833,297 A | * | 9/1974 | Swartz | ........................ 353/85 |
| 4,011,104 A | * | 3/1977 | Basiulis | ...................... 136/205 |
| 4,150,887 A | * | 4/1979 | Huber | ........................ 353/85 |
| 4,829,327 A | * | 5/1989 | Grunwald | .................... 353/85 |
| 5,253,260 A | * | 10/1993 | Palombo | ...................... 372/34 |
| 5,283,694 A | | 2/1994 | Frady | |
| RE36,060 E | * | 1/1999 | Miyashita | .................... 348/748 |
| 5,918,469 A | * | 7/1999 | Cardella | ........................ 62/3.7 |
| 6,224,216 B1 | | 5/2001 | Parker et al. | |
| 6,401,462 B1 | * | 6/2002 | Bielinski | ...................... 62/3.7 |
| 6,428,170 B1 | * | 8/2002 | Haba | ........................... 353/57 |
| 6,447,121 B1 | * | 9/2002 | Woo | ............................ 353/52 |
| 6,472,828 B1 | | 10/2002 | Pruett et al. | |
| 6,607,277 B2 | * | 8/2003 | Yokoyama et al. | ........... 353/52 |
| 6,751,027 B2 | * | 6/2004 | Van Den Bossche et al. | . 353/52 |
| 6,764,183 B2 | * | 7/2004 | Okazaki | ...................... 353/31 |
| 2004/0135874 A1 | * | 7/2004 | Oehlbeck et al. | ........... 347/232 |
| 2005/0040424 A1 | * | 2/2005 | Erchak et al. | .............. 257/100 |

FOREIGN PATENT DOCUMENTS

GB  2 387 025 A  10/2003

* cited by examiner

*Primary Examiner*—Christopher Mahoney
(74) *Attorney, Agent, or Firm*—Schwabe Williamson & Wyatt

(57) ABSTRACT

A projection apparatus comprises a Light Emitting Diode (LED) and a cooling arrangement is described herein.

10 Claims, 11 Drawing Sheets

PROJECTION LED COOLING

FIELD OF THE INVENTION

The present invention relates to the field of projection, in particular, the employment of Light Emitting Diodes (LEDs) as light sources, and their cooling.

BACKGROUND OF INVENTION

The uses for LEDs have grown. In particular, there is increase interest in the employment of LEDs as light sources for projection engines/system. This growth has been due in large part to the increase in the light output of the LEDs. Historically, the low light output from LEDs made them impractical for use in applications requiring significant light output, for example, in outdoor applications. However, as LED light output continues to increase, LEDs are finding application in an increase number of areas.

The apparent light output of an LED depends on a number of factors. Such factors include the viewing angle of the LED with respect to the optical center as well as the brightness of the LED. The brightness of the LED is itself a function of a number of factors. For example, the brightness can be affected by the amount of current being delivered to an LED and the junction temperature of the LED.

BRIEF DESCRIPTION OF DRAWINGS

Embodiments of the present invention will be described referencing the accompanying drawings in which like references denote similar elements, and in which.

DETAILED DESCRIPTION OF THE EMBODIMENTS

In the following detailed description, novel methods and apparatuses for cooling a Light Emitting Diode (LED) are disclosed. In this description, mention is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
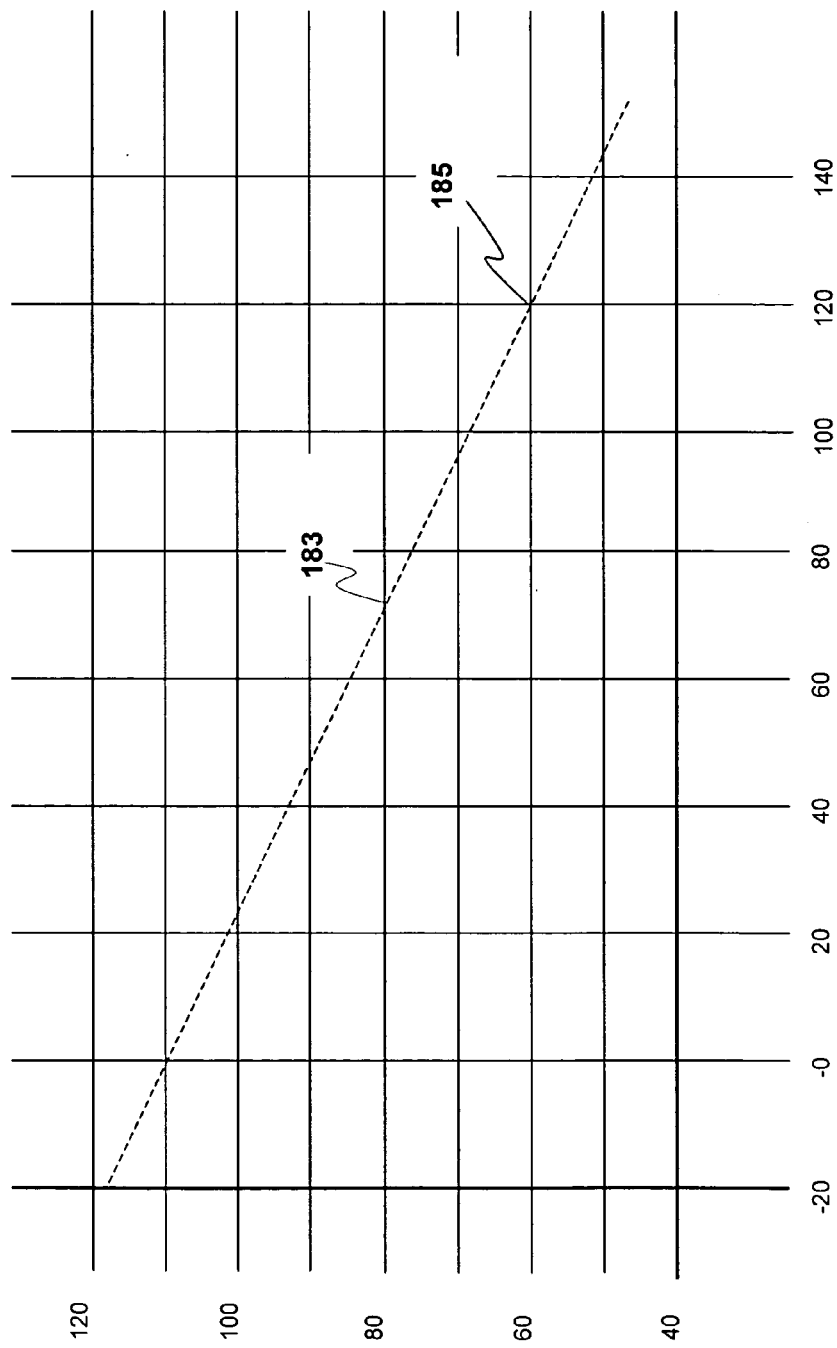
FIG. 1 illustrates a relative light output for a particular green LED as a function of junction temperature.

LEDs are frequently rated with a certain light output characteristics at a particular junction temperature (i.e. the temperature of the light emitting portion of the LED). For example, an LED may be rated as having a 100% value (e.g. normalized) for its light output at 25 degrees C. The light output may be determined relative to this for other values of the junction temperature. FIG. 1 illustrates a relative light output for a particular green LED as a function of junction temperature. As the junction temperature increases, generally, the relative light output value is reduced relative to the value at 25 degrees C. The particular green LED, for example, may have a relative light output of 80% of its 25 degree value at 70 degrees C. 183. The particular green LED may have a relative light output of only 60% of its 25 degree C. value at 120 degree C. 185.

Thus, cooling an LED may provide the ability to produce greater light output when compared to an uncooled LED. Various methods may be used to cool LEDs. For example, a heat sink may be coupled to an LED. Alternatively, forced air may be used to cool an LED. While these methods may cause the junction temperature to be reduced, the reduction in junction temperature may not be to a sufficient temperature to obtain a targeted light output. As disclosed herein, additional methods may be employed to produce a greater reduction in the junction temperature of an LED and, consequently, allow for an increase in the light output of the LED.

Figure 2:
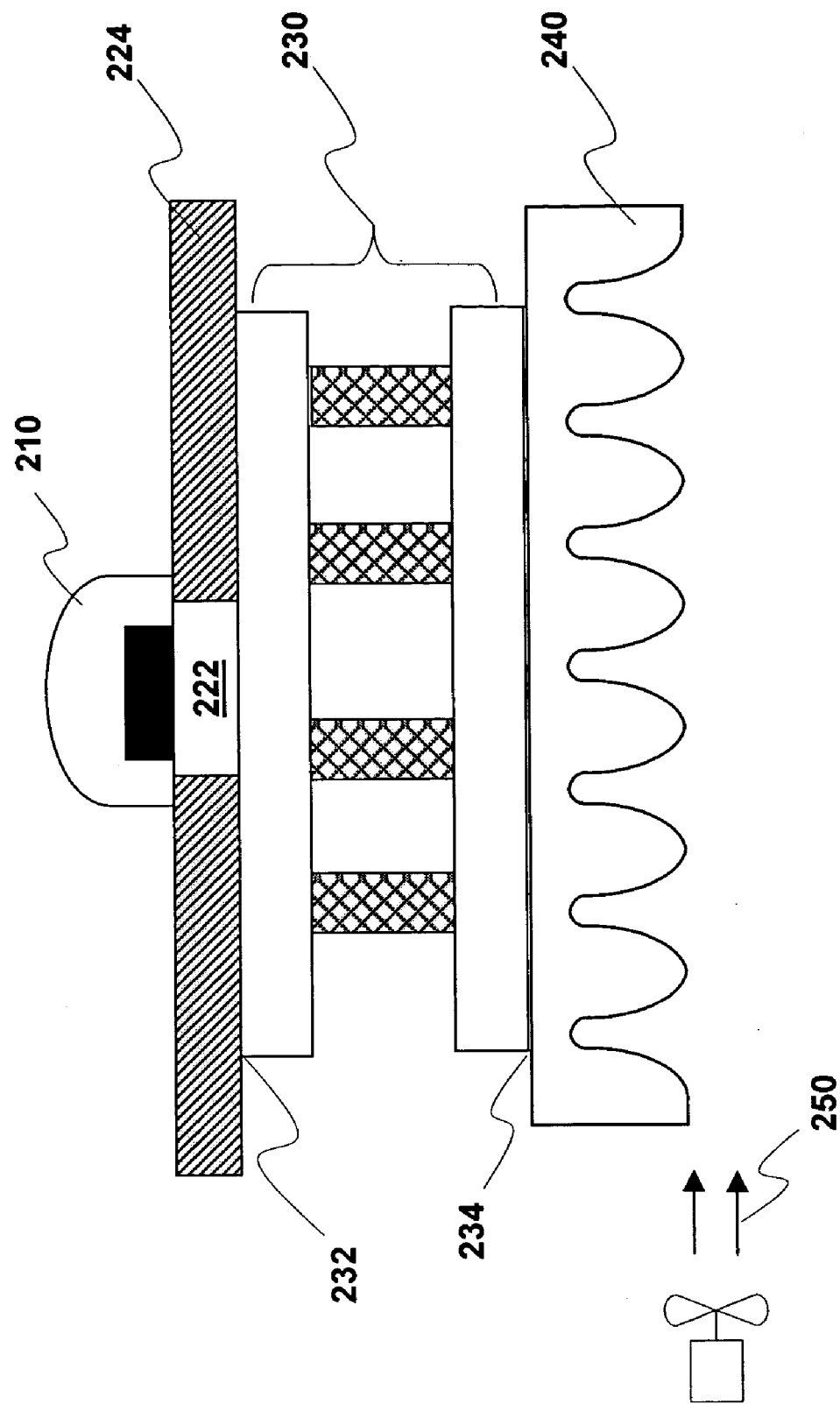
FIG. 2 illustrates a device comprising a cooling device for an LED, in accordance with one embodiment.

FIG. 2 illustrates a device comprising a cooling device for an LED, in accordance with one embodiment. In the embodiment illustrated, an LED 210 is thermally coupled via a thermally conductive path to a thermoelectric cooler 230 (e.g. a Peltier Device). The thermally conductive path may be a thermal conductive slug 222 in a thermally insulating substrate 224. In another embodiment, the LED is coupled directly to the thermoelectric cooler. The cool end 232 of the thermoelectric cooler is thermally coupled to the LED 210. In the embodiment illustrated, the hot end 234 of the thermoelectric cooler is coupled to a heat sink 240. The heat sink is disposed in a forced air flow 250 to provide for greater cooling. However, in an alternate embodiment, natural, instead of forced, convection may be utilized to cool the heat sink instead. In other embodiments, the forced air flow may be utilized to cool the thermoelectric cooler directly without the use of a heat sink. Also note that while the heat sink 240 is illustrated as physically coupled to thermoelectric cooler 210, in alternative embodiments the coupling may be just thermal in nature.

The temperature on the hot side of the thermoelectric cooler may be substantially higher than the temperature of the un-cooled LED. Thus, more extensive method of dissipating the higher temperature may be employed. For example, a larger heat sink may be employed to cool both the thermoelectric cooler and the LED. However, a determination may be made on whether the added expenditure of the larger heat sink is justified, in view of the resulting opportunity to obtain a higher light output.

Figure 3:
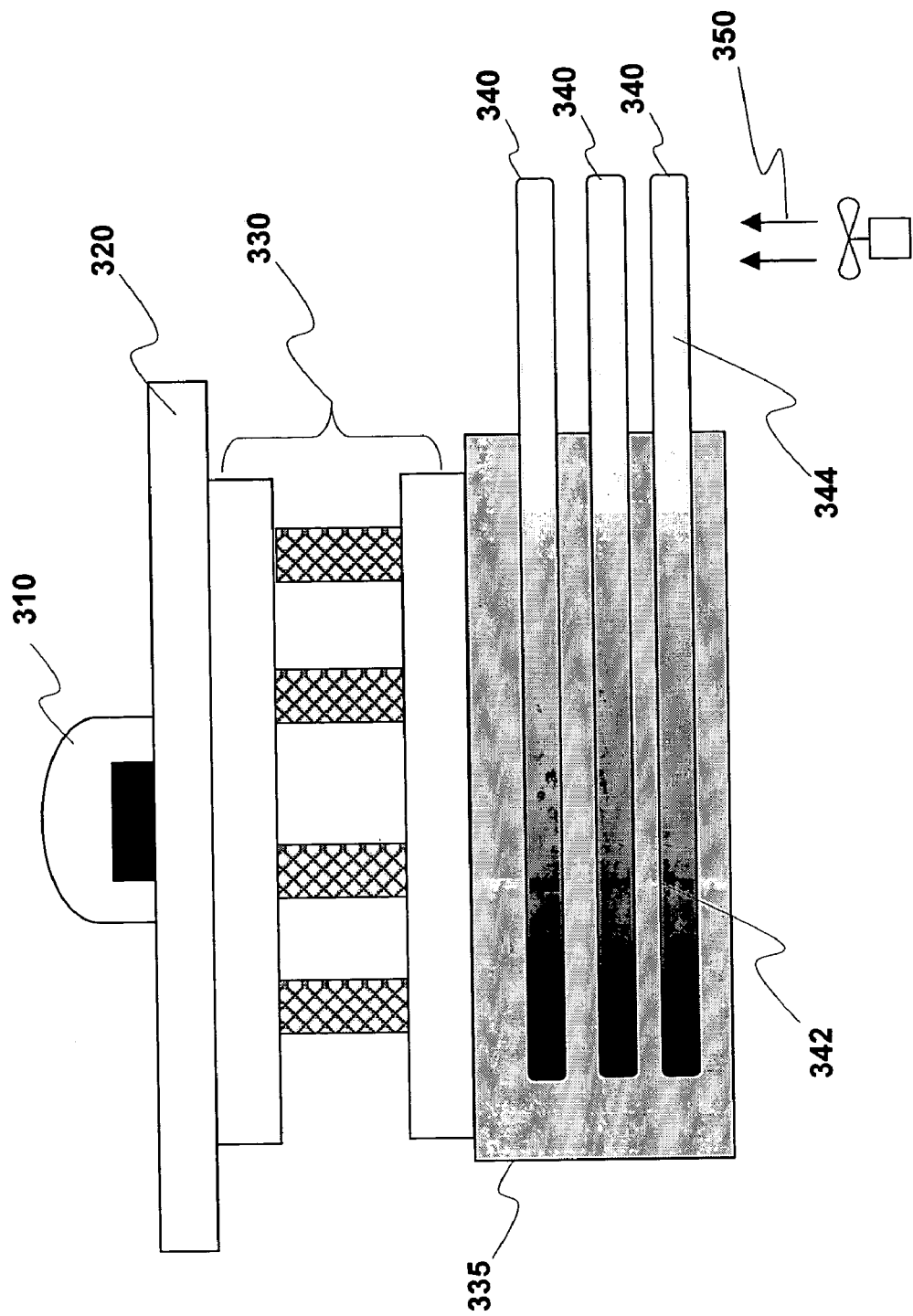
FIG. 3 illustrates an LED with an alternative arrangement in accordance with one embodiment.

FIG. 3 illustrates an LED with an alternative arrangement in accordance with one embodiment. Illustrated in FIG. 3, the LED 310 is mounted on printed circuit board 320 having a metal core, e.g. an aluminum core. The printed circuit board 320 is coupled to a thermoelectric cooler 330. The thermoelectric cooler 330 is in turn coupled to a thermal block 335. The thermal block 335 has in it the ends of several cooling sticks 340. The cooling sticks 340 are hollow sticks having a refrigerant inside. The other ends of the cooling sticks 340 are in a forced air flow 350. As the refrigerant heats inside the thermal block, it vaporizes and is transferred to the cooler sides 344 of the cooling sticks in the forced air flow. The vapor then condenses and the cooler condensed liquid is transferred back to the warmer sides 342 of the cooling sticks.

Figure 4:
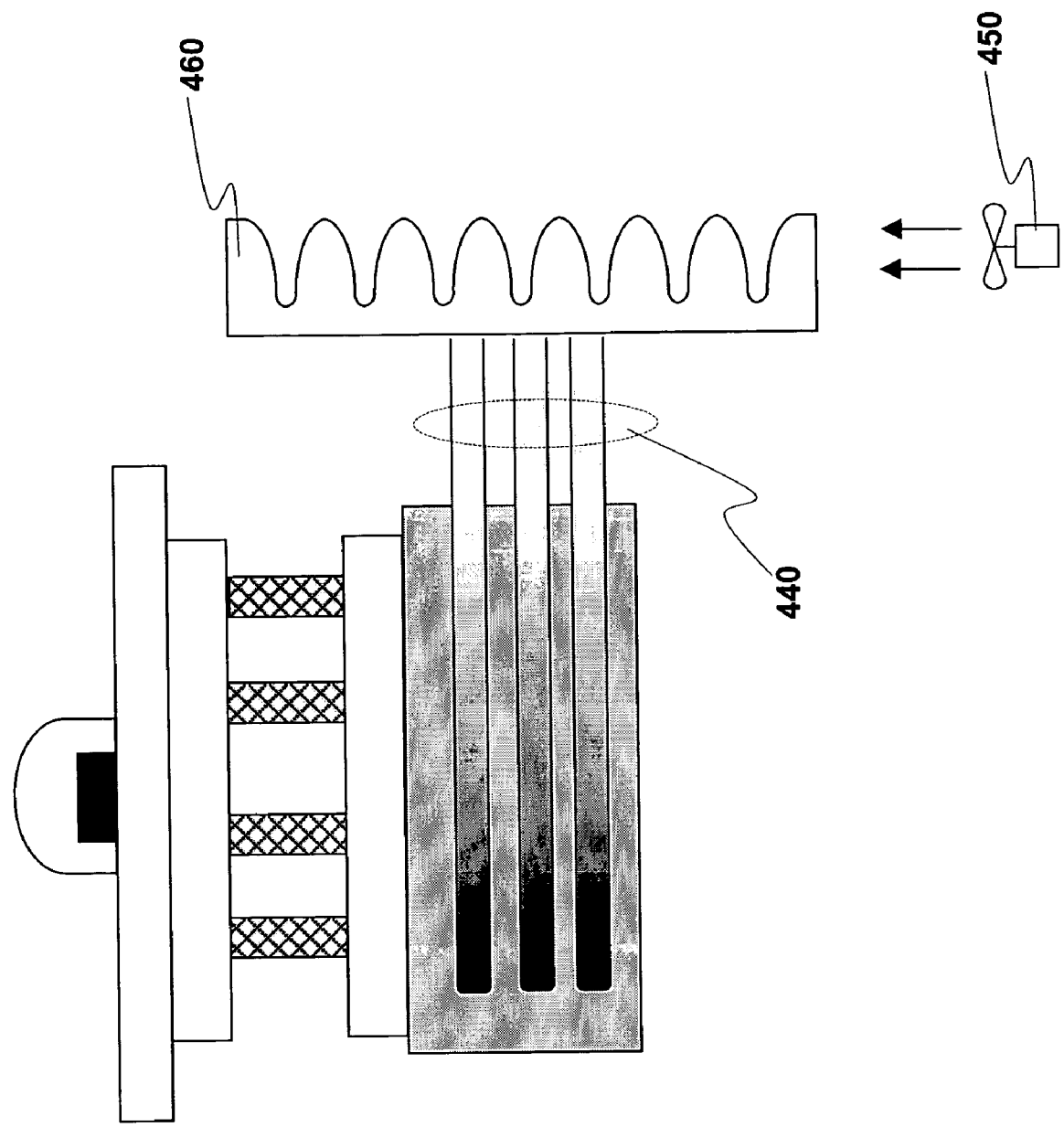
FIG. 4 illustrates an LED cooling scenario utilizing cooling sticks in accordance with another embodiment.

FIG. 4 illustrates an LED cooling scenario utilizing cooling sticks in accordance with another embodiment. In this embodiment, the sides of the cooling sticks 440 not in the thermal block are coupled to one or more heat sinks 460. The heat sinks 460 are then utilized to disperse the heat transferred to the heat sinks 460 by the cooling sticks 440. The cooling may be via natural convection of heat off the heat sink. Alternatively, there may be a forced air environment 450 surrounding the heat sink 460 providing forced convection cooling.

Figure 5:
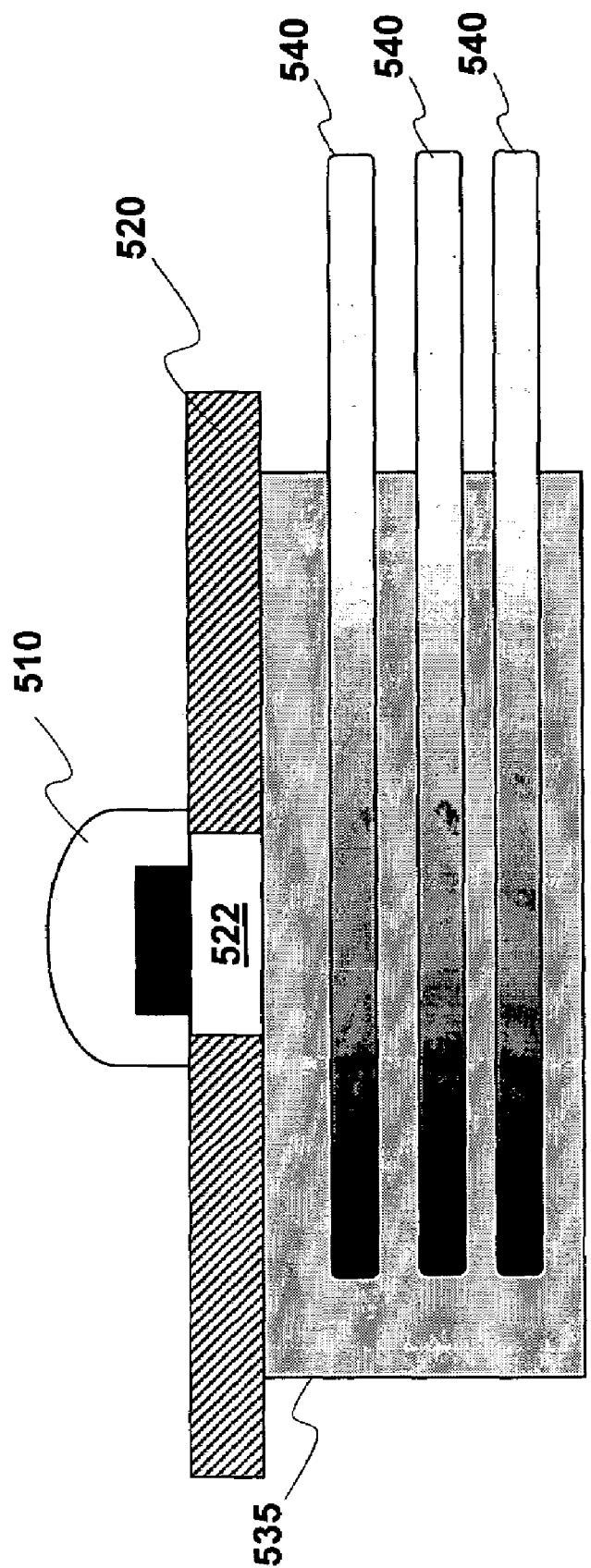
FIG. 5 illustrates an LED cooling system with a thermal block connected without the thermoelectric cooler.

FIG. 5 illustrates an LED cooling system with a thermal block connected without the thermoelectric cooler. In this more passive embodiment, the thermal block 535 is coupled to a 520 PCB containing a thermal slug 522. The thermal slug 522 provides a thermal coupling between the LED 510 and the thermal block 535. The thermal block 535 is thermally coupled to heat sticks 540. This embodiment may provide a lower cost solution that also consumes less power vis-á-vis embodiments utilizing the thermoelectric cooler.

Figure 6:
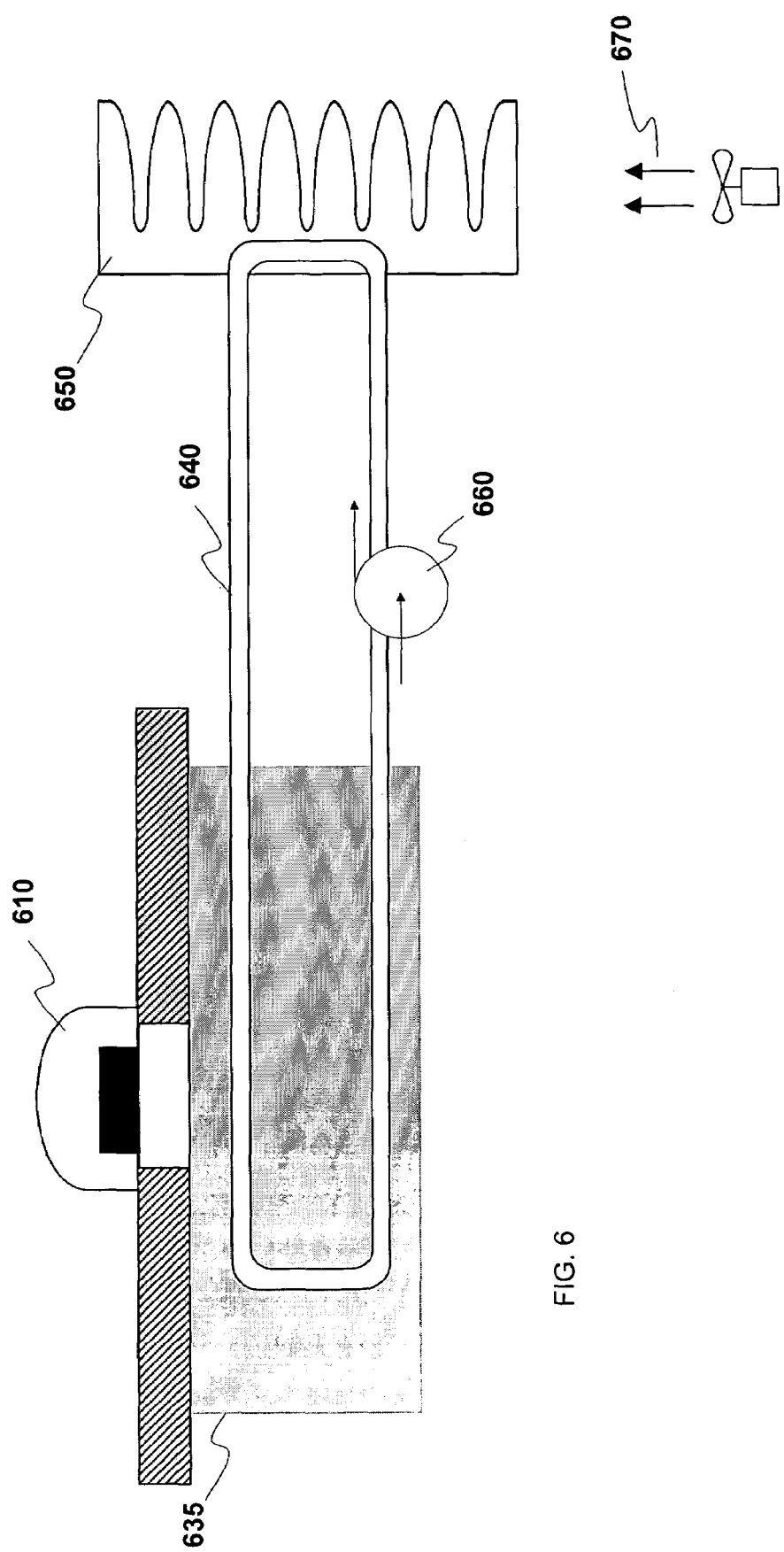
FIG. 6 illustrates an LED utilizing a liquid cooling system in accordance with one embodiment.

FIG. 6 illustrates an LED utilizing a liquid cooling system in accordance with one embodiment. The LED 610 is thermally coupled to a thermal block 635. The thermal block 635 is coupled to a liquid cooling system. In the embodiment illustrated, the liquid cooling system includes liquid in a liquid path 640 coupled to a heat exchanger 650 and the thermal block 635. In one embodiment, the liquid may be a refrigerant. The liquid cooling system further comprises a fluid pump 660 to facilitate circulation of the liquid through the system. The liquid is heated as it passes through the thermal block 635. The heated liquid is pumped to the heat exchanger 650. The heat exchanger 650 is utilized to cool the liquid. In the embodiment illustrated the cooling of the liquid is aided by forced air 670.

Figure 7:
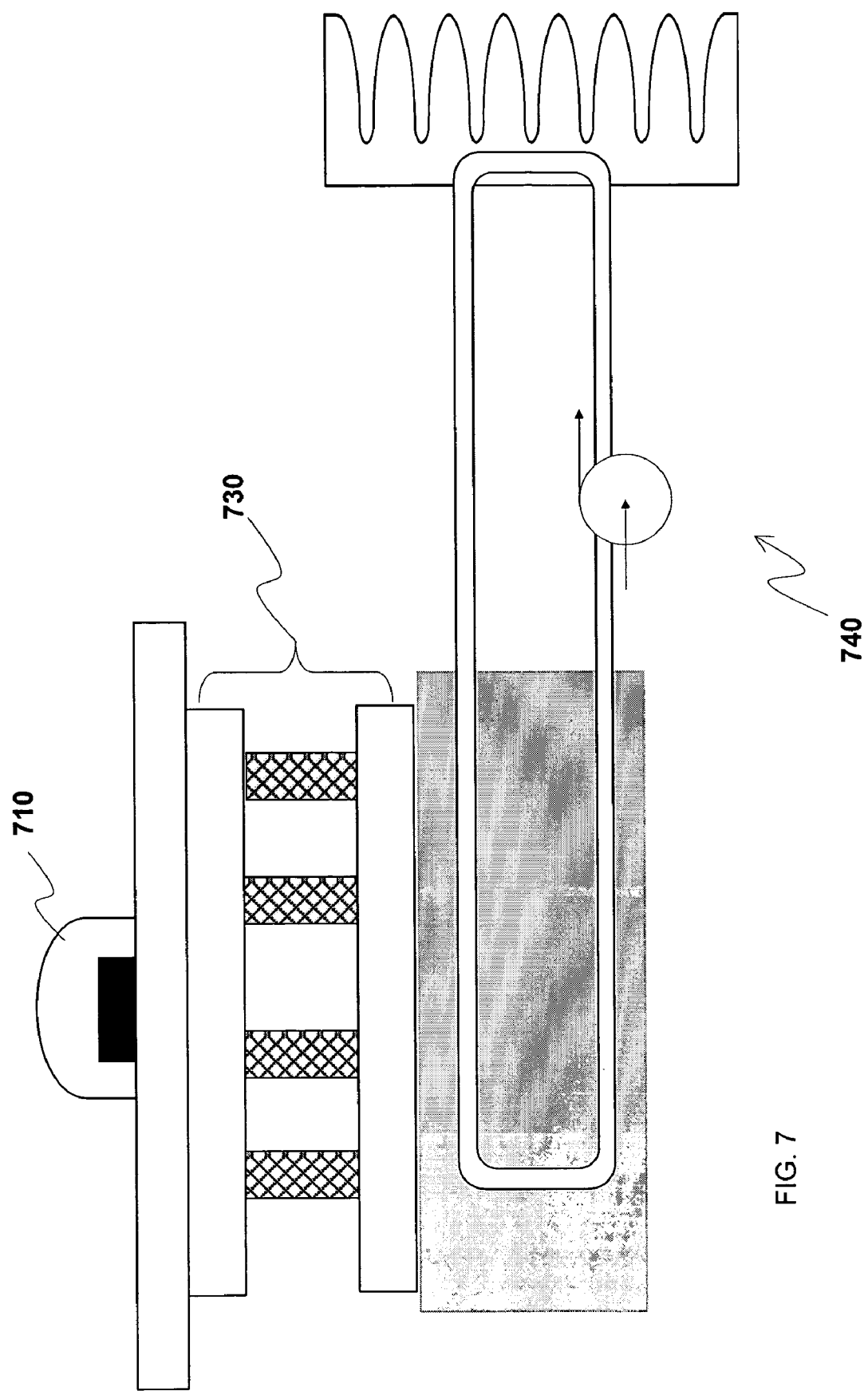
FIG. 7 illustrates an LED utilizing a liquid cooling system in accordance with another embodiment.

FIG. 7 illustrates an LED utilizing a liquid cooling system in accordance with another embodiment. To further facilitate cooling of the LED 716, a thermoelectric cooler 730 is thermally coupled between the thermal block 730 and the LED 710. A liquid cooling system 740 is then utilized to cool the hot side of the thermoelectric cooler 730.

The above disclosed embodiments for cooling an LED may be part of a feedback loop. Feedback may be utilized to control the operation of an LED or the cooling of an LED. In one embodiment, a thermal sensor is placed near an LED, or thermally downstream from the LED (which is nonetheless indicative of the thermal state of the LED). In another embodiment, a thermal sensor is integral to a LED. The thermal sensor may be characterized such that output from the thermal sensor is well correlated to a key temperature in the LED. The output from the thermal sensor may be sent to a processor for processing. The processing may involve generating control outputs to control a cooling controller. The cooling controller may control any cooling device that can responsively affect cooling such as a thermoelectric cooler, a heat pump or a fan. Algorithms utilized by the processor may be designed to improve any desired parameter such as LED lifetime, LED brightness, system acoustics, etc.

Figure 8:
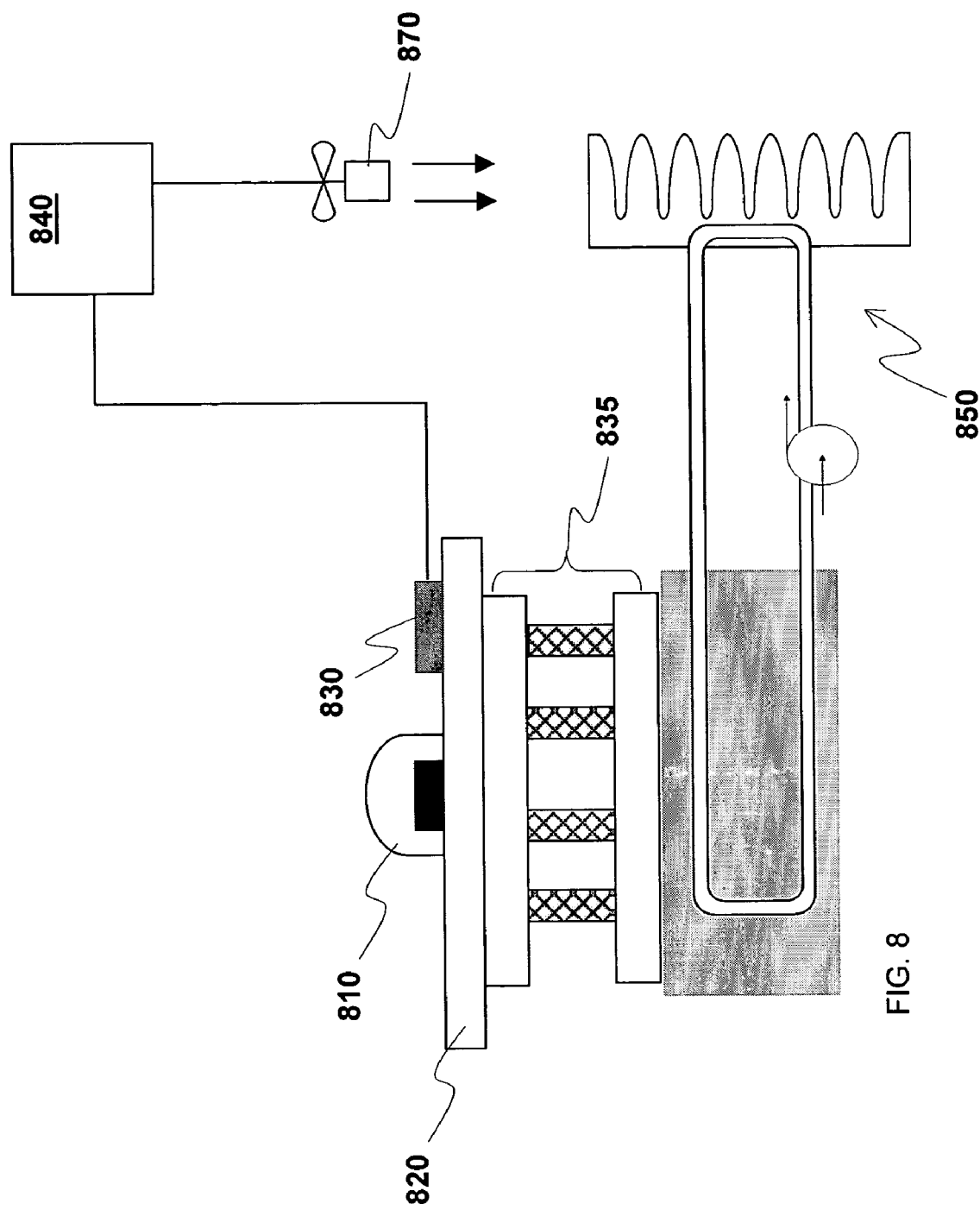
FIG. 8 illustrates an embodiment where a thermal sensor is utilized to monitor the thermal output of an LED.

FIG. 8 illustrates an embodiment where a thermal sensor 830 is utilized to monitor the thermal output of an LED 810. In this embodiment, the thermal sensor 830 is on a thermally conductive printed circuit board 820 upon which the LED 810 is mounted. The thermally conductive printed circuit board 820 is coupled to a thermoelectric cooler 835 and cooling system 850. The thermal sensor 830 provides information to a processor 840 on the thermal output of the LED 810. The processor 840 then acts to control a fan 870 forcing air over the heat exchanger in the cooling system 850, and/or to control the cooling system pump, and/or to control the TE cooler current based on the provided information.

Figure 9:
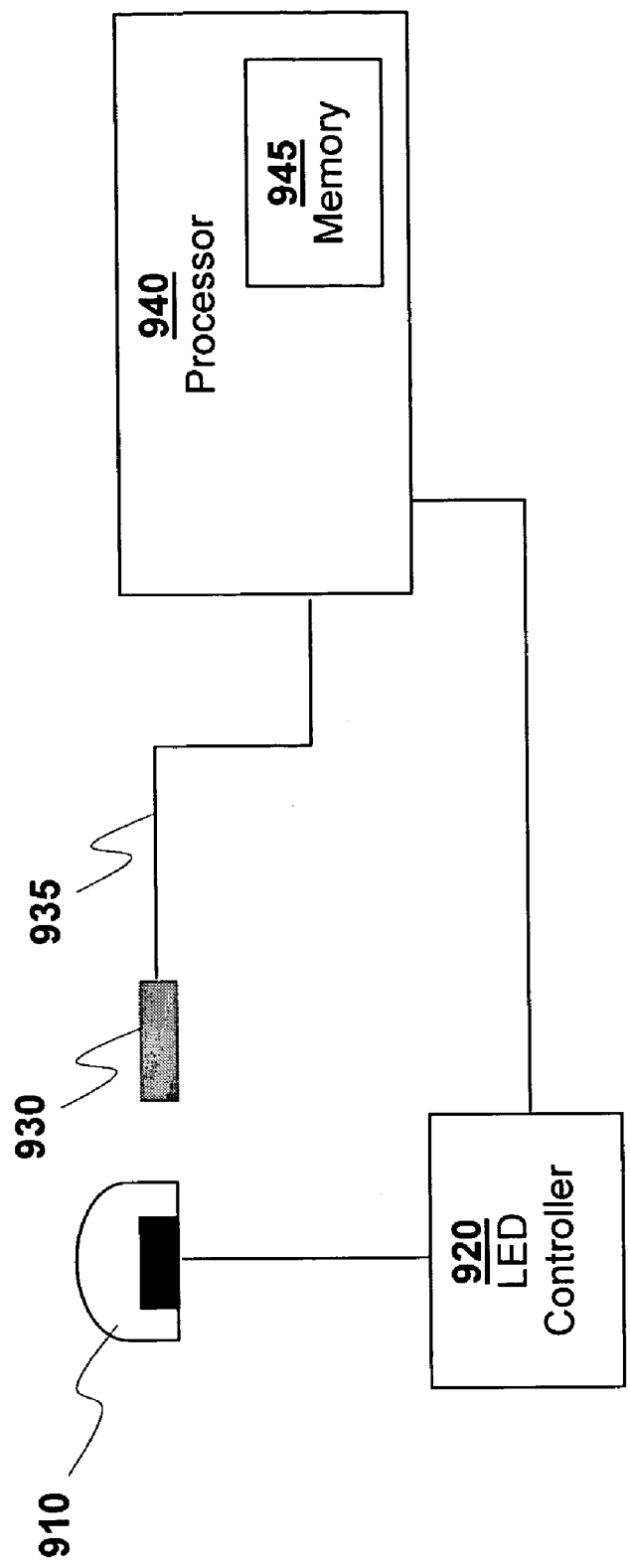
FIG. 9 illustrates a system wherein thermal feedback is utilized to control the output of an LED, in accordance with one embodiment.

FIG. 9 illustrates a system wherein thermal feedback is utilized to control the output of an LED 910, in accordance with one embodiment. A thermal sensor 930 is thermally coupled to the LED 910. Signals 935 from the thermal sensor 930 may be sent to a processor 940. The processor 940 controls an LED driver 920 that, in turn, controls the LED 910. The processor 940 may be executing software instructions containing algorithms designed to analyze the feedback thermal information from the thermal sensor 930 and provide control information to the LED driver 920. For example, if the LED 910 is too hot, the LED driver 920 may be instructed by the processor via a control value to attenuate the light output of the LED 910. This attenuation may be accomplished by the processor 940 "looking up" a new control value from a table stored in memory 945. The table may contain control values for particular thermal information provided to the processor 940 by the thermal sensor 930. In one embodiment the control value may be a new current level to be provided to the LED 910 and the thermal information may be a measured temperature by the thermal sensor 930. The control system may operate on the LED 910 until a desired temperature is obtained at the thermal sensor 930. In another embodiment, algorithms instead of lookup tables may be used to determine control information to be provided to the LED controller. Copending application titled "LED PROJECTOR DRIVE SCHEMES", which was filed concurrently, provides information on LED drive schemes. The specification of which is hereby fully incorporated by reference.

Figure 10:
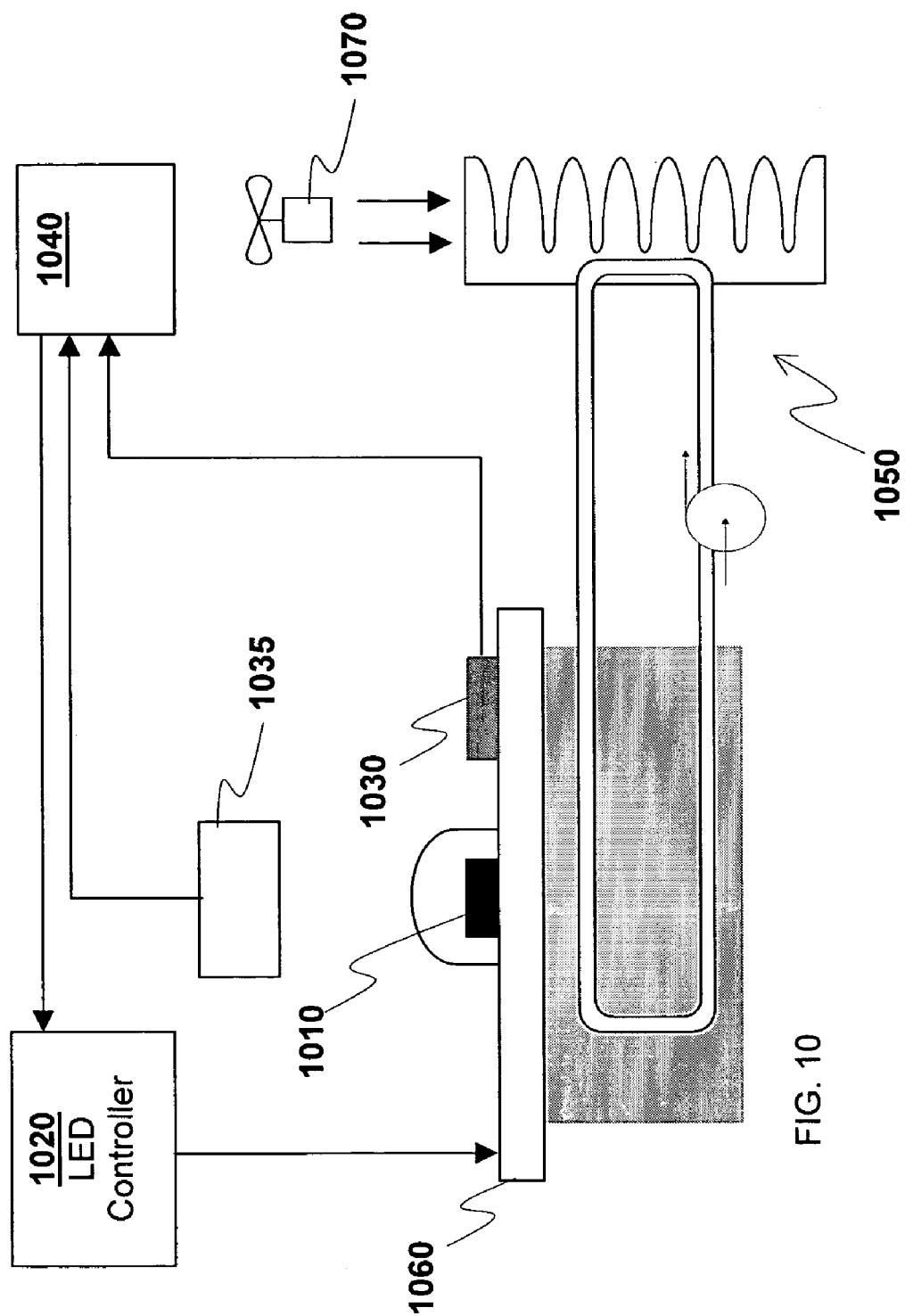
FIG. 10 illustrates a system wherein thermal feedback is utilized to control the output of an LED, in accordance with another embodiment.

FIG. 10 illustrates a system wherein thermal feedback is utilized to control the output of an LED 1010, in accordance with another embodiment. In this embodiment, by monitoring the temperature of the LED 1010 via a thermal sensor 1030, a processor 1040 may control both the power to the LED 1010 and the driver 1020 to the cooling device. For example, a light output monitor 1035 may provide information to the processor 1040 on the light output of the LED 1010. In the embodiment illustrated, the current is provided to the LED 1010 through signal traces in a circuit board 1060. It may be determined that it is undesirable to further reduce the light output of the LED 1010 by informing controller to decrease current to the LED 1010. In this case, it may be desirable to increase the cooling of the LED by the cooling system 1050. For example, a forced air cooling solution may increase the cooling of the LED 1010 by increasing the forced air flow 1070 across a heat exchanger.

Figure 11:
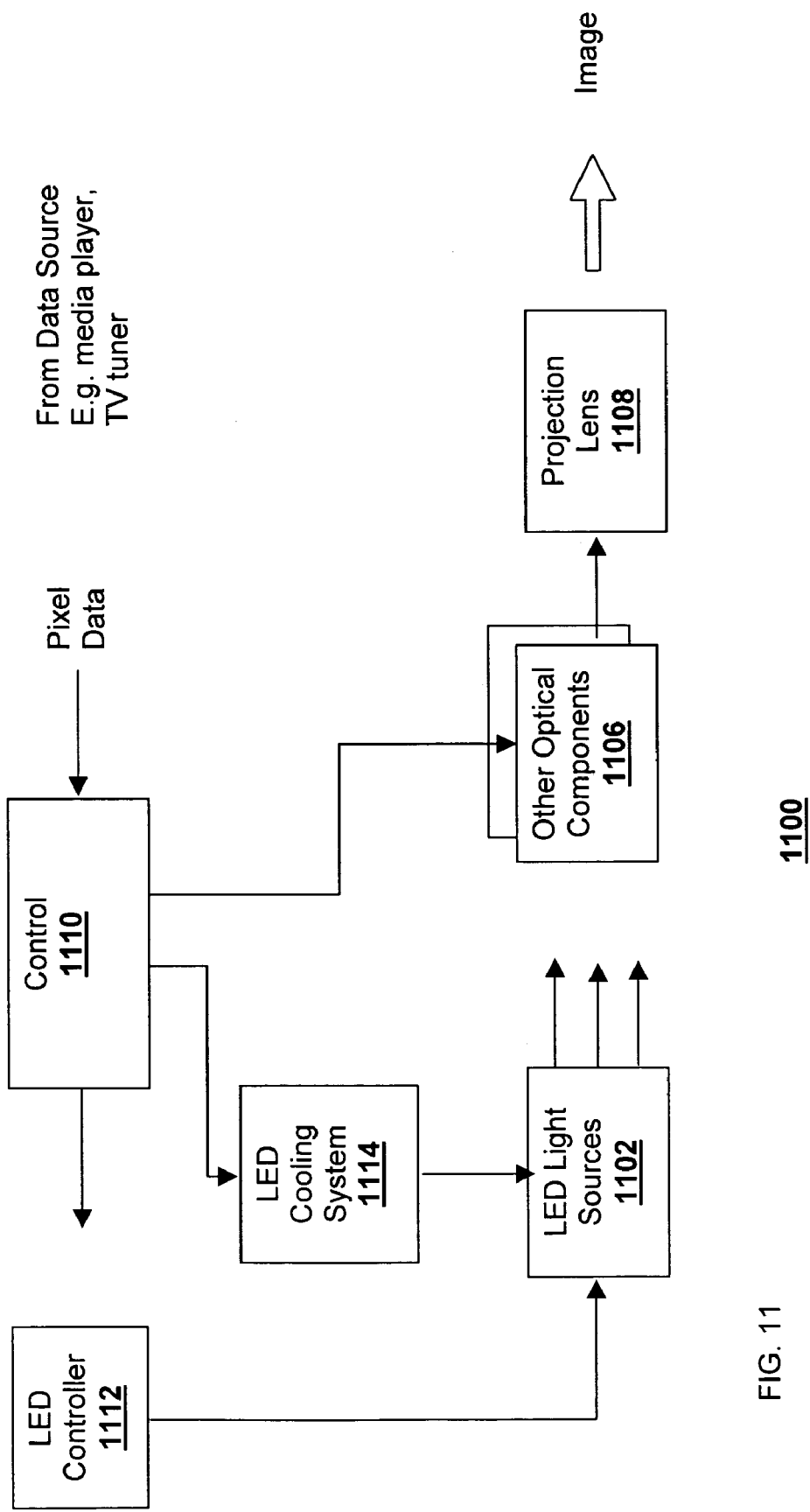
FIG. 11 illustrates a block diagram view of a projection system for projecting images, in accordance with one embodiment of the present invention.

FIG. 11 illustrates a block diagram view of a projection system 1100 for projecting images, in accordance with one embodiment of the present invention. As illustrated, for the embodiment, projection system 1100 includes a projection engine having LED light sources 1102, a number of other optical components 1106 and projection lens 1108, optically coupled to each other as shown. In various embodiments, other optical components 1106 include in particular, a light valve (not explicitly shown). Additionally, for the embodiment, projection system 1100 includes control block 1110 electrically coupled to control LED lights sources 1102 through LED controller 1112, LED cooling system 1114 and other optical components 1106.

LED Light sources 1102 are employed to provide a number of primary color light bundles. In various embodiments, the primary color light bundles comprise a red, a blue and a green light bundle. In alternate embodiments, other primary color light bundles may be provided instead.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A projection apparatus comprising:
    a Light Emitting Diode (LED) to produce light for projection;
    a power supply coupled to the LED to provide power to the LED;
    a thermal sensor thermally coupled to the LED and configured to provide an output based at least in part on a thermal condition of the LED;
    a cooling system thermally coupled to the LED; and
    a processor coupled to the thermal sensor and configured to control the power supply in a manner to partially attenuate the power provided to the LED and to control the cooling system to cool the LED based at least in part on the output received from the thermal sensor.

2. The projection apparatus of claim 1 wherein the cooling system comprises a liquid cooling system.

3. The projection apparatus of claim 1 wherein the cooling system comprises a thermoelectric cooler.

4. The projection apparatus of claim 1, further comprising:
    a light output monitor coupled to the processor and configured to provide information on an amount of light output by the LED; and
    the processor further configured to control the power supply and the cooling system based at least in part on the provided information on the amount of light output by the LED.

5. A projection apparatus comprising:
    a light emitting diode (LED) to produce light for projection;
    a power supply coupled to the LED to provide power to the LED;
    a cooling system thermally coupled to the LED;
    a light output monitor to provide information on an amount of light output from the LED; and
    a processor, coupled to the power supply, the cooling system, and the light output monitor, and configured to control at least the power supply and the cooling system based at least in part on the provided information from the light output monitor.

6. The projection apparatus of claim 5, further comprising:
    a thermal sensor thermally coupled to the LED and configured to provide an output based at least in part on a thermal condition of the LED; and
    the processor being further configured to control at least the power supply or the cooling system based at least in part on the provided output from the thermal sensor.

7. The projection apparatus of claim 5, wherein the cooling system comprises a thermoelectric cooler.

8. The projection apparatus of claim 5, wherein the cooling system comprises a plurality of cooling sticks.

9. The projection apparatus of claim 5, wherein the cooling system is a liquid cooling system.

10. The projection apparatus of claim 9, wherein the cooling system includes a forced air cooling device.

* * * * *